US005856029A

United States Patent [19]

Burrows

[11] Patent Number: 5,856,029

[45] Date of Patent: Jan. 5, 1999

[54] ELECTROLUMINESCENT SYSTEM IN MONOLITHIC STRUCTURE

[75] Inventor: Kenneth Burrows, McKinney, Tex.

[73] Assignee: E.L. Specialists, Inc., Allen, Tex.

[21] Appl. No.: 656,435

[22] Filed: May 30, 1996

[51] Int. Cl.[6] .......................... B32B 27/04; B32B 27/30; B32B 15/00

[52] U.S. Cl. .......................... 428/690; 313/502; 313/503; 313/506; 313/509; 428/917

[58] Field of Search .................................... 428/690, 917, 428/691; 313/502–509, 512

[56] References Cited

U.S. PATENT DOCUMENTS

| | | | |
|---|---|---|---|
| 3,875,449 | 4/1975 | Byler et al. | 313/466 |
| 4,548,646 | 10/1985 | Mosser et al. | 106/14.12 |
| 4,684,353 | 8/1987 | DeSouza | 445/51 |
| 4,816,717 | 3/1989 | Harper et al. | 313/502 |
| 4,853,079 | 8/1989 | Simopoulos et al. | 216/25 |
| 4,853,594 | 8/1989 | Thomas | 313/503 |
| 4,999,936 | 3/1991 | Calamia et al. | 40/554 |
| 5,243,060 | 9/1993 | Barton et al. | 556/435 |
| 5,491,377 | 2/1996 | Janusaukas | 313/506 |

FOREIGN PATENT DOCUMENTS 63-160622 1/1990 Japan .

OTHER PUBLICATIONS

PCT Written Opinion dated May 26, 1998—International application No. PCT/IS97/09112 (counterpart PCT filing to instant U.S. application).

Samsung Chemical Company, "Sam Sung Co's Technology Service About Screen Printing", downloaded Mar. 16, 1998 from the Internet at http://www.sgiakor.org.inf.htm.

*Primary Examiner*—Mary E. Mosher
*Attorney, Agent, or Firm*—Vinson & Elkins L.L.P.

[57] ABSTRACT

An electroluminescent system in which neighboring layers are suspended, prior to application, in advantageously a unitary carrier compound, so that after curing, the layers form active strata within a monolithic mass. The carrier compound in a preferred embodiment is a vinyl resin in gel form. The invention enables several manufacturing advantages, including the ability to silk-screen print the entire electroluminescent system on a variety of substrates, including cloth, metals, plastics, wood or even stone.

22 Claims, 3 Drawing Sheets

ELECTROLUMINESCENT SYSTEM IN MONOLITHIC STRUCTURE

TECHNICAL FIELD OF THE INVENTION

This invention relates, in general, to electroluminescent systems, and more specifically, to an electroluminescent system applied in layers suspended advantageously in a unitary common carrier, which layers, thereafter, harden together to form active strata within a monolithic structure.

BACKGROUND OF THE INVENTION

Electroluminescent lighting has been known in the art for many years as a source of light weight and relatively low power illumination. Because of these attributes, electroluminescent lamps are in common use today providing light for displays in, for example, automobiles, airplanes, watches, and laptop computers. One such use of electroluminescence is providing the back light necessary to view Liquid Crystal Displays (LCD).

Electroluminescent lamps may typically be characterized as "lossy" parallel plate capacitors of a layered construction. Electroluminescent lamps of the current art generally comprise a dielectric layer and a luminescent layer separating two electrodes, at least one of which is translucent to allow light emitted from the luminescent layer to pass through. The dielectric layer enables the lamp's capacitive properties. The luminescent layer is energized by a suitable power-supply, typically about 115 volts AC oscillating at about 400 Hz, which may advantageously be provided by an inverter powered by a dry cell battery. Electroluminescent lamps are known, however, to operate in voltage ranges of 60 V–500 V AC, and in oscillation ranges of 60 Hz–2.5 KHz.

It is standard in the art for the translucent electrode to consist of a polyester film "sputtered" with indium-tin-oxide (ITO). Typically, the use of the polyester film sputtered with ITO provides a serviceable translucent material with suitable conductive properties for use as an electrode.

A disadvantage of the use of this polyester film method is that the final shape and size of the electroluminescent lamp is dictated greatly by the size and shape of manufacturable polyester films sputtered with ITO. Further, a design factor in the use of ITO sputtered films is the need to balance the desired size of electroluminescent area with the electrical resistance (and hence light/power loss) caused by the ITO film required to service that area. Generally, a large electroluminescent layer will require a low resistance ITO film to maintain manageable power consumption. Thus, the ITO sputtered films must be manufactured to meet the requirements of the particular lamps they will be used in. This greatly complicates the lamp production process, adding lead times for customized ITO sputtered films and placing general on the size and shape of the lamps that may be produced. Moreover, the use of ITO sputtered films tends to increase manufacturing costs for electroluminescent lamps of nonstandard shape.

The other layers found in electroluminescent lamps in the art are suspended in a variety of diverse carrier compounds (often also referred to as "vehicles") that typically differ chemically from one another. As will be described, the superimposition of these carrier compounds upon one another and on to the sputtered ITO polyester film creates special problems in the manufacture and performance of the lamp.

The electroluminescent layer typically comprises an electroluminescent grade phosphor suspended in a cellulose-based resin in liquid form. In many manufacturing processes, this suspension is applied over the sputtered ITO layer on the polyester of the translucent electrode. Individual grains of the electroluminescent grade phosphor are typically of relatively large dimensions so as to provide phosphor particles of sufficient size to luminesce strongly. This particle size, however, tends to cause the suspension to be non-uniform. Additionally, the relatively large particulate size of the phosphor can cause the light emitted from the electroluminescent to appear grainy.

The dielectric layer typically comprises a titanium dioxide and barium-titanate mixture suspended in a cellulose-based resin, also in liquid form. Continuing the exemplary manufacturing process described above, this suspension is typically applied over the electroluminescent layer. It should be noted that for better luminescence, the electroluminescent layer generally separates the translucent electrode and the dielectric layer, although those in the art will understand that this is not a requirement for a functional electroluminescent lamp. It is possible that unusual design criteria may require the dielectric layer to separate the electroluminescent layer and the translucent electrode. It should also be noted that, occasionally, both the phosphor and dielectric layers of the lamps in the art utilize a polyester-based resin for the carrier compound, rather than the more typical cellulose-based resin discussed above.

The second electrode is normally opaque and comprises a conductor, such as silver and/or graphite, typically suspended in an acrylic or polyester carrier.

A disadvantage of the use of these liquid-based carrier compounds standard in the art is that the relative weight of the various suspended elements causes rapid separation of the suspension. This requires the frequent agitation of the liquid solution to maintain the suspension. This agitation requirement adds a manufacturing step and a variable to suspension quality. Furthermore, liquid carrier compounds standard in the art tend to be highly volatile and typically give off noxious or hazardous fumes. As a result, the current manufacturing process must expect evaporative losses in an environment requiring heightened attention to worker safety.

A further disadvantage in combining different carrier compounds, as is common in the art, is that the bonds and transitions between the multiple layers are inherently radical. These radical transitions between layers tend strongly to de-laminate upon flexing of the assembly or upon exposure to extreme temperature variations.

A still further disadvantage in combining different carrier compounds is that different handling and application requirements are created for each layer. It will be appreciated that each layer of the electroluminescent lamp must be formed using different techniques including compound preparation, application, and curing techniques. This diversity in manufacturing techniques complicates the manufacturing process and thus affects manufacturing cost and product performance.

A need in the art therefore exists for an electroluminescent system in which the layers are suspended in a unitary common carrier. A structure would thereby be created in which, once cured, layers will become strata in a monolithic mass. Manufacturing will thus tend to be simplified and product performance will tend to improve.

SUMMARY OF THE INVENTION

The present invention addresses the above-described problems of electroluminescent lamps standard in the art by suspending layers, prior to application, in a unitary carrier compound, advantageously a vinyl resin in gel form. Once cured, the unitary carrier compound thus effectively bonds each individually applied layer into a stratified monolithic mass. As a result, electroluminescent lamps made in accordance with the present invention are stronger, and less prone to de-lamination. Also, manufacturing is simplified.

As noted, a preferred embodiment of the present invention uses a vinyl resin in gel form as the unitary carrier compound. This choice of carrier is surprisingly contrary to the expected teachings of the prior art. As noted above, a functional electroluminescent lamp requires a dielectric layer to enable capacitive properties. Vinyl resin is not commonly used as a dielectric material and, thus, its utilization is counter intuitive. This choice of carrier has further, and somewhat serendipitously, proven to be compatible with a wide variety of substrates, including metals, plastics and cloth fabrics. Moreover, unlike traditional carrier compounds, vinyl gel is highly compatible with well-known manufacturing techniques such as silk-screen layer printing.

A preferred application of the presently preferred embodiment is in the apparel industry. It will be readily appreciated that the electroluminescent system as disclosed herein may be applied by conventional silk-screening techniques to a very wide range of garments and attire, so as to create electroluminescent designs of virtually limitless shape, size and scope. This application should be distinguished from apparel techniques previously known in the art where pre-manufactured electroluminescent lamps of predetermined shape and size were combined and affixed to apparel by sewing, adhesive, or other similar means. It will be understood that the present invention distinguishes clearly from such techniques in that, unlike prior systems, the fabric of the apparel is used as the substrate for the electroluminescent system.

It will also be understood that the present invention is expressly not limited to apparel applications. As noted, the present invention is compatible with a very wide range of substrates and thus has countless further applications, including, but not limited to, emergency lighting, instrumentation lighting, LCD back lighting, information displays, backlit keyboards, etc. In fact, the scope of this invention suggests strongly that in any application where, in the past, information or visual designs have been communicable by ink applied to a substrate, such applications may now be adapted to have that same information enhanced or replaced by electroluminescence.

It will be further appreciated that accessories standard in the art may be combined with the present invention to widen yet further the scope of applications thereof. For example, dyes and/or filters may be applied to obtain virtually any color. Alternatively, timers or sequencers may be applied to the power supply to obtain delays or other temporal effects.

It will be further appreciated that, while a preferred embodiment of the present invention involves application by silk-screen printing techniques, any number of application methods will be suitable. For example, individual layers may alternatively be applied to a substrate by spraying under force from a nozzle not in contact with the substrate. It should be further noted that, according to the present invention, each of the layers comprising the electroluminescent system of the present invention may even be applied in a fashion different from its neighbor.

A technical advantage of the present invention is that, although applied serially, layers of the present invention bond inherently strongly to their neighbors because of the use of a unitary carrier compound. This bonding of each layer enables a stratified monolithic mass. The monolithic structure of the present invention will then tend not to de-laminate upon flexing as has been found to be a disadvantage with current systems.

A further technical advantage of the present invention is that by using a unitary carrier compound for multiple layers, manufacturing tends to be simplified and manufacturing costs will be inevitably reduced. Only one carrier compound need be purchased and handled in a preferred embodiment of the present invention. Furthermore, layer application and materials handling, including equipment cleanup, is simplified, since each layer may be applied by a like process, will require similar conditions to cure, and is cleanable with the same solvents.

A still further technical advantage of the present invention when utilizing a vinyl resin in gel form as the carrier is that the gel maintains continued full suspension of the active ingredients long after the initial mixing thereof. It will be understood that such maintained suspension results in savings in manufacturing costs because the ingredients tend not to settle out of the suspension, eliminating the need for re-agitation.

Furthermore, a gel carrier tends to reduce spoilage, since gels are less volatile than carrier compounds used traditionally in the art. Spoilage is reduced further by the increased suspension life as described above. The requirement in the art for frequent agitation of volatile carrier compounds tends to encourage evaporation of the carrier compounds. By eliminating the need for frequent agitation, less carrier compound will tend to evaporate.

A further technical advantage of the present invention is realized by using admixtures in the electroluminescent layer whose particulate structure is smaller than the encapsulated electroluminescent grade phosphor also suspended therein. The addition of such admixtures result in a more uniform application of the electroluminescent layer. Such admixtures also tend to act as an optical diffuser that remediates the grainy effect of the phosphor's luminescence. Finally, experimentation suggests that such admixtures may even cooperate with phosphor at the molecular level to enhance the luminescence of the encapsulated phosphor itself.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
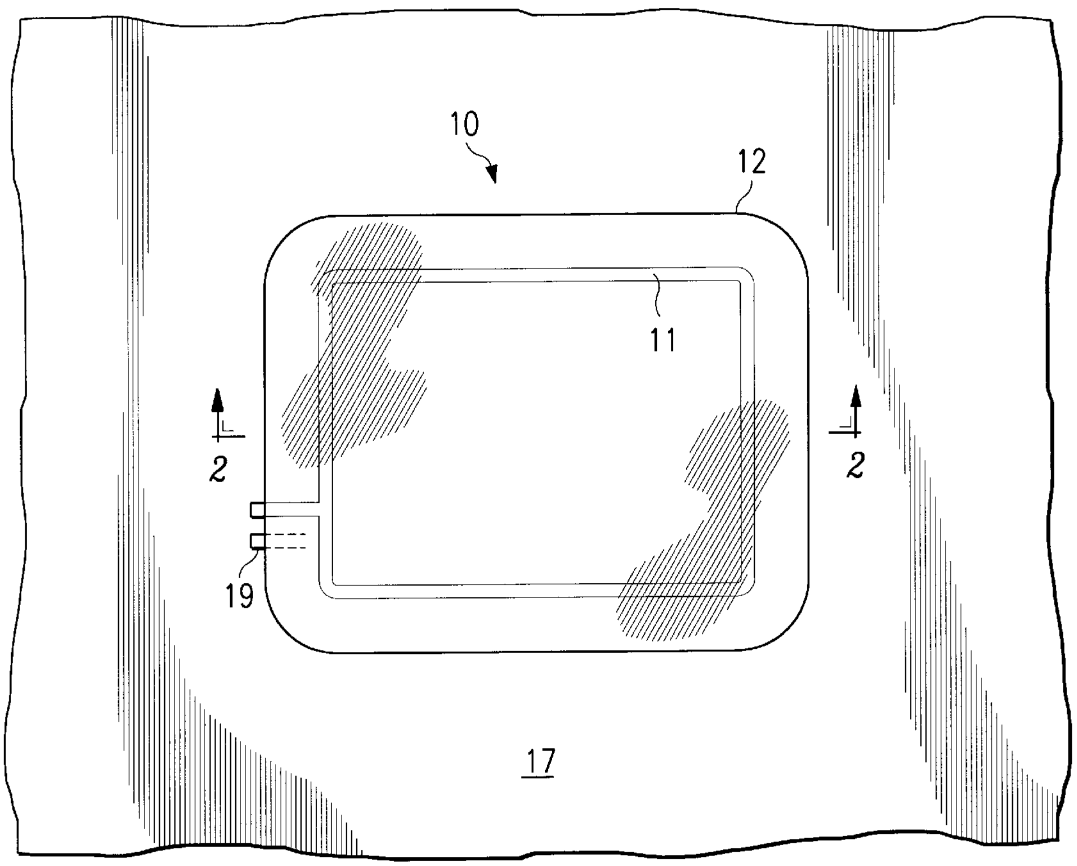
FIG. 1 is a plan view of electroluminescent lamp 10 applied to substrate 17.
Figure 2:
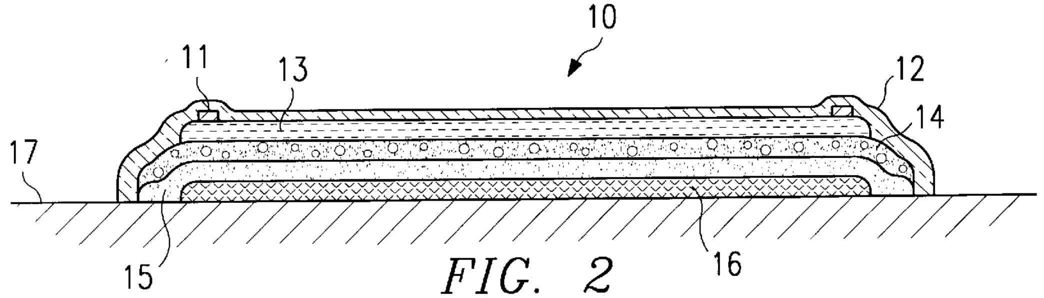
FIG. 2 is a cross-section of electroluminescent lamp 10 as shown on FIG. 1.

Referring to FIG. 1, electroluminescent lamp 10 is applied to substrate 17, and comprises, with reference to FIG. 2, cover 12, bus bar 11, translucent electrode 13, luminescent layer 14, dielectric layer 15, and rear electrode 16. In a presently preferred embodiment, substrate 17 is a cloth or textile substrate such as polyester cotton or leather. According to the present invention, however, substrate 17 may be any material suitable to support electroluminescent lamp 10 as a substrate, for example metal, plastic, paper, glass, wood, or even stone.

Referring again to FIG. 1, contact 19 is shown projecting from cover 12, contact 19 being in electrical connection with rear electrode 16. Power source (not shown), advantageously 110 v/400 Hz AC, may thus be connected electrically to rear electrode 16 via contact 19. It will be appreciated that contact 19 may also take the form of a bus bar, analogous to bus bar 11 discussed below, in order to enhance conductivity between rear electrode 16 and the power source.

Still referring to FIG. 1, bus bar 11 is disposed around the perimeter of electroluminescent lamp 10. Bus bar 11 is connected to the other side of the AC power source (not shown) to enable electrical connection between translucent electrode 13 and the power source. It will be understood that bus bar 11 may also be reduced to a small contact, analogous to contact 19, in other embodiments of the present invention, or alternatively bus bar 11 may be applied only to a single edge of translucent electrode 13.

It will be understood that bus bar 11 and contact 19 may be made from any suitable electrically conductive material. In the preferred embodiment herein both bus bar 11 and contact 19 are very thin strips of copper.

It can be seen from FIG. 2 that electroluminescent lamp 10 is structurally analogous to a parallel plate capacitor, rear electrode 16 and translucent electrode 13 being said parallel plates. When the power source is energized, the dielectric layer 15 provides nonconducting separation between rear electrode 16 and translucent electrode 13, while luminescent layer 14, which includes encapsulated phosphor suspended therein, becomes excited and emits photons to give light.

It will be seen on FIG. 2 that in the preferred embodiment herein disposes dielectric layer 15 and luminescent layer 14 to overlap rear electrode 16 and translucent electrode 13. The advantage of such a structure is to discourage direct electrical contact between rear electrode 16 and translucent electrode 13 and thereby reducing the chances of a short circuit occurring. It shall be understood, however, that all layers of the current invention may be of any size, so long as rear electrode 16 and translucent electrode 13 are electrically separated by a dielectric layer 15 and luminescent layer 14.

According to the present invention, one or more, and advantageously all of the layers comprising back electrode 16, dielectric layer 15, luminescent layer 14, translucent electrode 13 and cover 12 are deposited in the form of active ingredients (here after also referred to as "dopants") suspended in a unitary carrier compound. It will be understood that although the preferred embodiment herein discloses exemplary use of a unitary carrier in which all layers are suspended, alternative embodiments of the present invention may have less than all neighboring layers suspended therein. It will be further appreciated that consistent with the present invention, differing carrier compounds may also be used to suspend neighboring layers, so long as such differing carrier compounds are disposed to harden together to form a mass with monolithic properties.

In the presently preferred embodiment, the unitary carrier compound is a vinyl resin in gel form. Once hardened, electroluminescent lamp 10 thereby adopts the characteristics of a series of active strata deposited through a monolithic mass. Furthermore, use of a unitary carrier results in reduced manufacturing costs by virtue of economies associated with being able to purchase larger quantities of the unitary compound, as well as storing, mixing, handling, curing and cleaning similar suspensions.

Research has also revealed that the use of a carrier in gel form results in further advantages. The viscosity and encapsulating properties of a gel result in better suspension of particulate dopants mixed into the gel. This improved suspension requires less frequent, if any, agitation of the compound to keep the dopants suspended. Experience reveals that less frequent agitation results in less spoilage of the compounds during the manufacturing process.

Furthermore, vinyl resin in gel form is inherently less volatile and less noxious than the liquid-based cellulose, acrylic and polyester-based resins currently used in the art. In a preferred embodiment of the present invention, the vinyl gel utilized as the unitary carrier is an electronic grade vinyl ink such as SS24865, available from Acheson. Such electronic grade vinyl inks in gel form have been found to maintain particulate dopants in substantially full suspension throughout the manufacturing process. Moreover, such electronic grade vinyl inks are ideally suited for layered application using silk-screen printing techniques standard in the art.

With reference to FIG. 2, doping the various layers illustrated thereon is advantageously accomplished by mixing predetermined amounts of the dopants, discussed in detail below, into separate batches of the unitary carrier. As noted, layers are advantageously deposited by silkscreening techniques standard in the art. It will be understood, however, that the present invention is not limited to any particular method of depositing one or more layers. After deposit and curing of the various layers, a stratified monolithic structure emerges displaying electroluminescent properties.

With further reference to FIG. 2, rear electrode 16 is illustrated as deposited on substrate 17. As noted earlier, in the preferred embodiment described herein, substrate 17 is a cloth fabric. It shall be understood, however, that in alternative embodiments where substrate 17 is itself electrically conductive, such as a metal, it may be advantageous or even necessary to deposit a first protective insulating layer (not shown) between rear electrode 16 and substrate 17. A first protective layer may also be advantageous when substrate 17 is a particularly porous material so as to ensure rear electrode 16 is properly insulated against discharge through substrate 17 itself. It will be appreciated that in such alternative embodiments, the first protective layer may ideally be the same material as cover 12 shown on FIG. 2, preferably the vinyl resin in gel form such as the unitary carrier compound for other layers. Consistent with the present invention, however, suitable alternative materials known in the art may be used to form a serviceable insulating first protective layer.

Rear electrode 16 comprises the unitary carrier doped with an ingredient to make the suspension electrically conductive. In a preferred embodiment, the doping agent in rear electrode 16 is silver in particulate form. It shall be understood, however, that the doping agent in rear electrode 16 may be any electrically conductive material including, but not limited to, gold, zinc, aluminum, graphite and copper, or combinations thereof. Experimentation has shown that proprietary mixtures containing silver/graphite suspended in electronic grade vinyl ink as available from Grace Chemicals as part numbers M4200 and M3001-1RS respectively, are suitable for use as rear electrode 16. Research has further revealed that layer thicknesses of approximately 8 to 12 microns give serviceable results. Layers may be deposited in such thicknesses using standard silk-screening techniques.

With regard to contact 19, as illustrated in FIG. 1, it is advantageous, although not obligatory, to apply contact 19 to rear electrode 16 prior to curing, so as to allow contact 19 to achieve optimum electrical contact between contact with rear electrode 16 as part of the monolithic structure of the present invention.

As shown in FIG. 2, dielectric layer 15 is deposited on rear electrode 16. Dielectric layer 15 comprises the unitary carrier doped with a dielectric in particulate form. In a preferred embodiment, this dopant is barium-titanate powder. Experimentation has shown that a suspension containing a ratio of 50% to 75%, by weight, of barium-titanate powder to 50% to 25% electronic grade vinyl ink in gel form, when applied by silk screening to a thickness of approximately 15 to 35 microns, results in a serviceable dielectric layer 15. The barium-titanate is advantageously mixed with the vinyl gel for approximately 48 hours in a ball mill. Suitable barium-titanate powder is available by name from Tam Ceramics, and the vinyl gel may be SS24865 from Acheson, as noted before. It will also be appreciated that the doping agent in dielectric layer 15 may also be selected from other dielectric materials, either individually or in a mixture thereof. Such other materials may include titanium-dioxide, or derivatives of mylar, teflon, or polystyrene.

It will be further appreciated that the capacitive characteristics of dielectric layer 15 will be dictated by the capacitive constant of the dielectric dopant as well as the thickness of dielectric layer 15. Those in the art will understand that an overly thin dielectric layer 15, with too little capacitance, may cause an unacceptable power drain. In contrast, an overly thick dielectric layer 15, with too much capacitance, will inhibit current flow through electroluminescent lamp 10, thus requiring more power to energize luminescent layer 14. Research has revealed that resolution of these competing considerations may be facilitated by use of Y5V, a proprietary barium-titanate derivative available from Tam Ceramics, as an additional or alternative dopant in the dielectric layer 15. Experimentation has noted that Y5V displays characteristics that apparently enhance the capacitive properties of dielectric layer 15 when Y5V is used either as a dopant or as a substitute for the barium-titanate powder suspended in dielectric layer 15.

It has also been demonstrated to be advantageous to deposit dielectric layer 15 in multiple layers. Experimentation has revealed that silk-screen techniques may tend to deposit layers with "pin-holes" in the layers. Such pin-holes in dielectric 15 inevitably cause breakdown of the capacitive structure of electroluminescent lamp 10. Therefore, dielectric layer 15 is advantageously applied in more than one silk-screen application, thereby allowing subsequent layers to plug pinholes from previous silk-screen applications.

In addition to pinhole remediation, depositing multiple layers may also yield further advantages to any layer of electroluminescent lamp 10, such as achieving a design thickness more precisely, or facilitating uniform curing. It will be understood, however, that the advantages of depositing multiple layers must also be balanced with a need to keep manufacturing relatively inexpensive and uncomplicated.

Still referring to FIG. 2, luminescent layer 14 is deposited on dielectric layer 15. Luminescent layer 14 comprises of the unitary carrier doped with electroluminescent grade encapsulated phosphor. Experimentation has revealed that a suspension containing 50% phosphor, by weight, to 50% electronic grade vinyl ink in gel form, when applied to a thickness of approximately 25 to 35 microns, results in a serviceable luminescent layer 14. The phosphor is advantageously mixed with the vinyl gel for approximately 10–15 minutes. Mixing should preferably be by a method that minimizes damage to the individual phosphor particles. Suitable phosphor is available by name from Osram Sylvania, and the vinyl gel may again be SS24865 from Acheson.

It shall be appreciated that the color of the light emitted from electroluminescent lamp 10 will depend on the color of phosphor used in luminescent layer 14, and may be further varied by the use of dyes. Advantageously, a dye of desired color is mixed with the vinyl gel prior to the addition of the phosphor. For example, rhodamine may be added to the vinyl gel in luminescent layer 14 to result in a white light being emitted when electroluminescent lamp 10 is energized.

Experimentation has also revealed that suitable admixtures, such as barium-titanate, improve the performance of luminescent layer 14. As noted above, admixtures such as barium-titanate have a smaller particle structure than the electroluminescent grade phosphor suspended in luminescent layer 14. As a result, the admixture tends to unify the consistency of the suspension, causing luminescent layer 14 to go down more uniformly, as well as assisting even distribution of the phosphor in suspension. The smaller particles of the admixture also tend to act as an optical diffuser which remediates a grainy appearance of the luminescing phosphor. Finally, experimentation also shows that a barium-titanate admixture actually may enhance the luminescence of the phosphor at the molecular level by stimulating the photon emission rate.

The barium-titanate admixture used in the preferred embodiment is the same as the barium-titanate used in dielectric layer 15, as described above. As noted, this barium-titanate is available by name in powder form from Tam Ceramics. In the preferred embodiment, the barium-titanate is pre-mixed into the vinyl gel carrier, advantageously in a ratio of 70%, by weight, of the vinyl gel, to 30% of the barium-titanate. This mixture is blended in a ball mill for at least 48 hours. If luminescent layer 14 is to be dyed, such dyes should be added to the vinyl gel carrier prior to ball mill mixing. Again, the vinyl gel carrier may be SS24865 from Acheson.

With further reference now to FIG. 2, translucent electrode 13 is deposited on luminescent layer 14. Translucent electrode 13 consists of the unitary carrier doped with a suitable translucent electrical conductor in particulate form. In a preferred embodiment of the present invention, this dopant is indium-tin-oxide (ITO) in powder form.

The design of translucent electrode 13 must be made with reference to several variables. It will be appreciated that the performance of translucent electrode 13 will be affected by not only the concentration of ITO used, but also the ratio of indium-oxide to tin in the ITO dopant itself. In determining the precise concentration of ITO to be utilized in translucent electrode 13, factors such as the size of the electroluminescent lamp and available power should be considered. The more ITO used in the mix, the more conductive translucent electrode 13 becomes. This is, however, at the expense of translucent electrode 13 becoming less translucent. The less translucent the electrode is, the more power that will be required to generate sufficient electroluminescent light. On the other hand, the more conductive translucent electrode 13 is, the less resistance electroluminescent lamp 10 will have as a whole, and so less the power that will be required to generate electroluminescent light. It will be therefore readily appreciated that the ratio of indium-oxide to tin in the ITO, the concentration of ITO in suspension and the overall layer thickness must all be carefully balanced to achieve performance that meets design specifications.

Experimentation has shown that a suspension of 25% to 50%, by weight, of ITO powder containing 90% indium-oxide and 10% tin, with 50% to 75% electronic grade vinyl ink in gel form, when applied by silk screening to a thickness of approximately 5 microns, results in a serviceable translucent electrode 13 for most applications. Advantageously, the ITO powder is mixed with the vinyl gel in a ball mill for approximately 24 hours. The ITO powder is available by name from Arconium, while the vinyl gel is again SS24865 from Acheson. It will also understood that the dopant in translucent electrode 13 is not limited to ITO, but may also be any other electrically conductive dopant with translucent properties.

It shall be understood that bus bar 11, as illustrated in FIG. 1, is applied to translucent electrode 13 during the manufacturing process to provide electrical contact between translucent electrode 13 the power source (not shown). In a preferred embodiment, bus bar 11 is placed in contact with translucent electrode 13 subsequent to the depositing of translucent electrode 13 on luminescent layer 14. It is advantageous to apply bus bar 11 to translucent electrode 13 prior to curing to allow bus bar 11 to become part of the monolithic structure of the present invention, thereby optimizing electrical contact between bus bar 11 and translucent electrode 13. It will nonetheless be understood that bus bar 11 may also be applied prior to depositing translucent electrode 13 or at any other time, so long as bus bar 11 remains disposed in electrical contact with translucent electrode 13 in the finished structure.

Still referring to FIG. 2, cover 12 encapsulates electroluminescent lamp 10 on substrate 17. Although not structurally necessary for electroluminescent lamp 10 to function, cover 12 is highly advantageous to seal the layers therein and thus substantially prolong the operating life of electroluminescent lamp 10. In a preferred embodiment, cover 12 is an undoped layer of the unitary carrier, again a vinyl gel such as SS24865 from Acheson, approximately 10 to 30 microns thick.

It will also be appreciate that active ingredients may be added to cover 12 to remediate specific problems or create advantageous effects. For example, a UV filter will assist prolonging the life of a lamp designed to operate outdoors in sunlight. Further, dyes or other coloring agents may be used to create color filters for particular applications.

It will be further understood that the present invention is not limited to the sequence of layers illustrated in FIG. 2 as presently preferred embodiment. As already noted, unusual design criteria might require dielectric layer 15 to separate translucent electrode 13 and luminescent layer 14. Alternatively, rear electrode 16 might also be translucent. In another application, translucent electrode 13 may be applied to substrate 17 if light is desired to be shone through the substrate.

Figure 3:
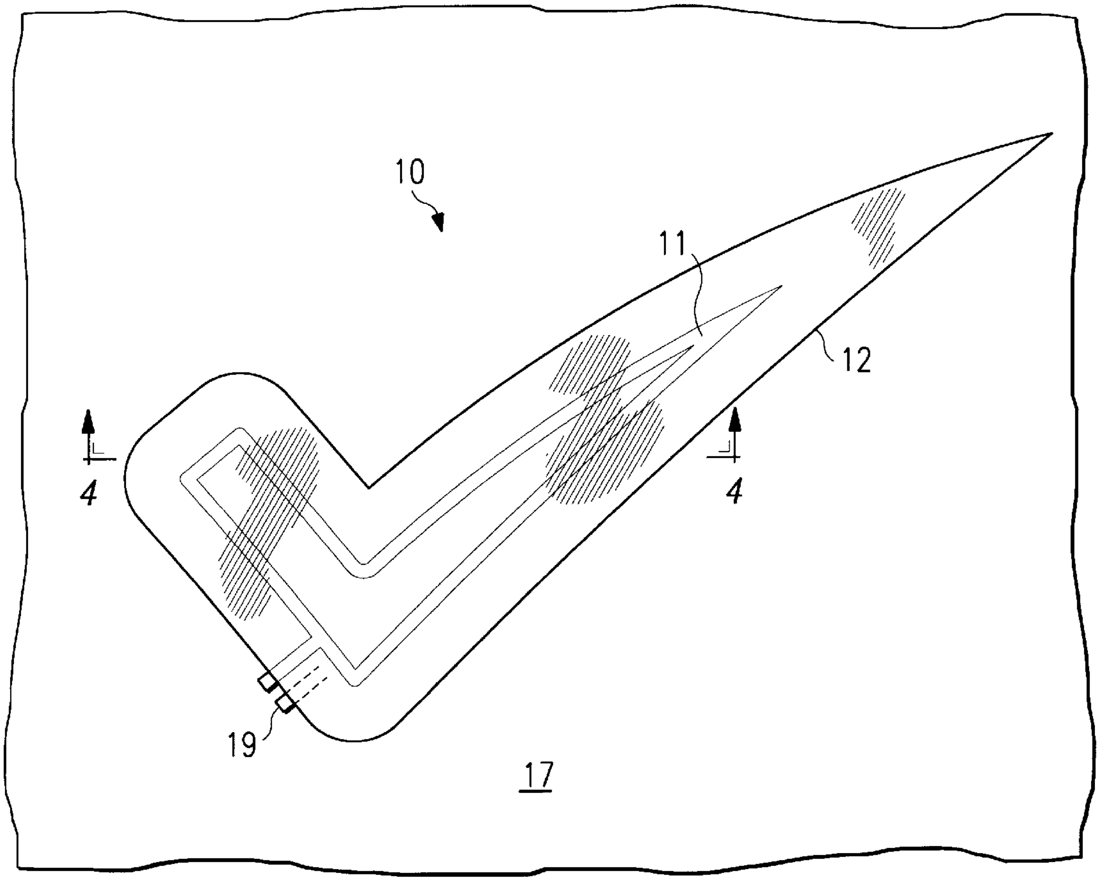
FIG. 3 illustrates a further electroluminescent lamp 10 of the present invention adopting a pre-defined "check mark" design.
Figure 4:
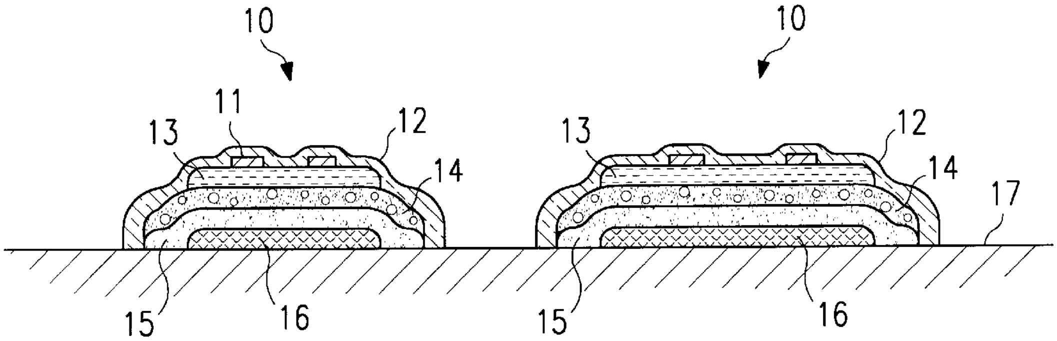
FIG. 4 is a cross-section of electroluminescent lamp 10 as shown on FIG. 3.

Directing attention now to FIG. 3 and FIG. 4, an alternative electroluminescent lamp 10 according to the preferred embodiment of the present invention is illustrated. Referring to FIG. 4, it can be seen that the layers of electroluminescent lamp 10 have been applied in a predetermined shape to provide a resulting predetermined electroluminescent image. This demonstrates an advantage realized from being able to silk-screen the layers of electroluminescent lamp 10 as suspended in a unitary gel carrier. The design size and shape of the lamp is no longer limited to constructs of the commercially available sizes and shapes of sputtered ITO film, and the monolithic properties of the final cured structure allow it to be supported by many different substrates. It shall be appreciated that as a result, an unlimited number of shapes and configurations of electroluminescent lamp 10, heretofore perhaps impossible or impractical, may be realized by the present invention.

Although not specifically illustrated, those in this art will also appreciate that instead of forming all layers of electroluminescent lamp 10 to a pre-defined shape and size, advantages may be gained when only luminescent layer 14 is deposited to that shape and size. One or more of the remaining layers may be larger, more uniform in shape, or even common to more than one discrete luminescent layer. Use of such a technique suggests manufacturing economies, but may need to be balanced against the cost of extra materials deposited.

Figure 5:
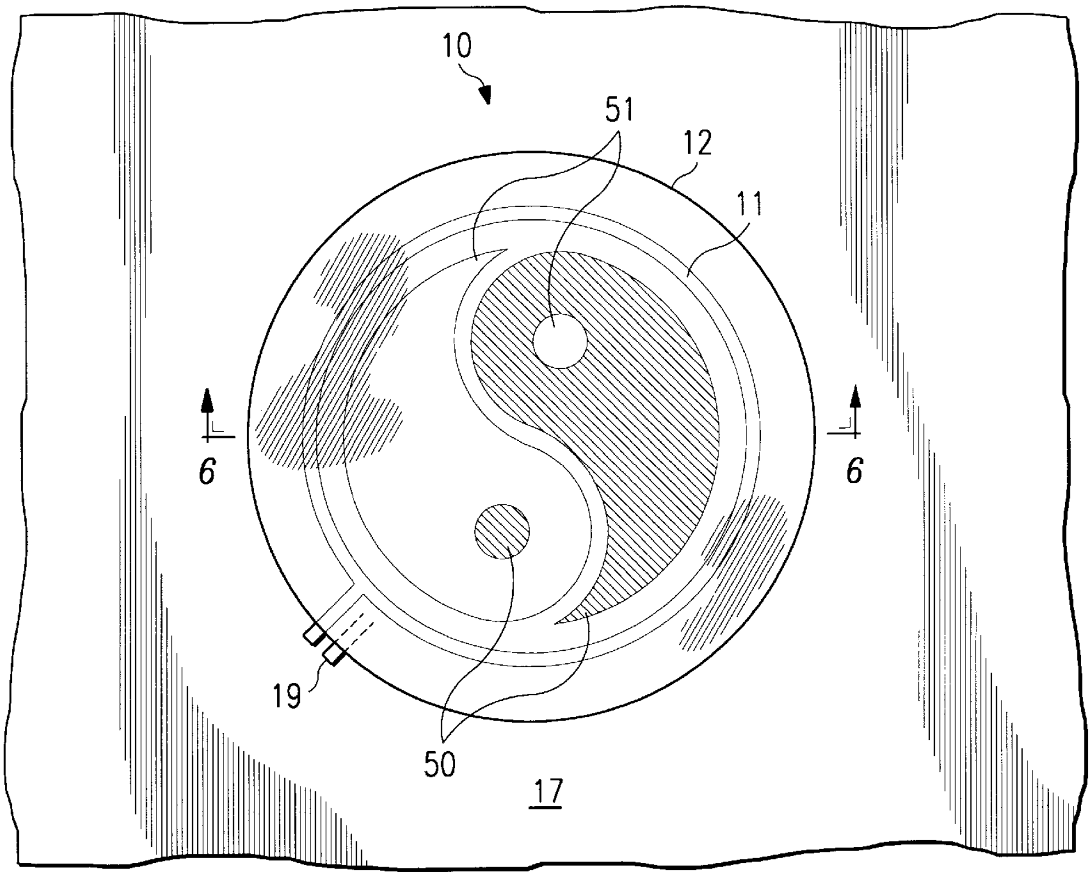
FIG. 5 illustrates electroluminescent lamp 10 of the present invention as applied to substrate 17 with tinted filters 50 and 51 defining an image.
Figure 6:
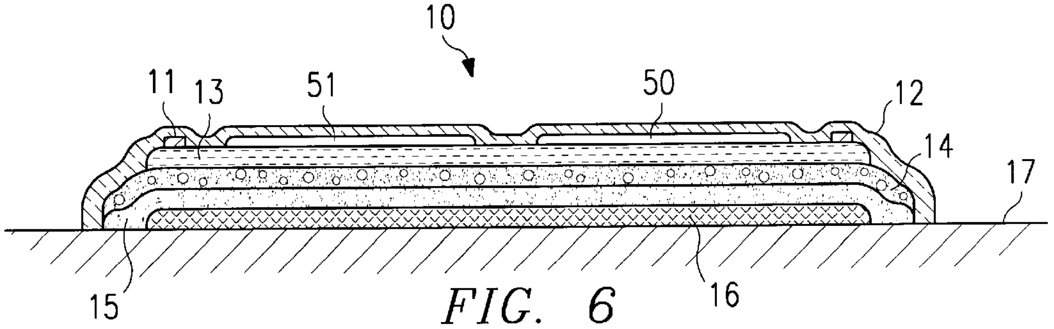
FIG. 6 is a cross-section of electroluminescent lamp 10 as shown on FIG. 5.

With reference to FIG. 5 and FIG. 6, electroluminescent lamp 10 is illustrated with tinted filters 50 and 51 disposed therein. In this alternative embodiment of the present invention, as illustrated in FIG. 6, tinted filters 50 and 51 are overlaid on translucent electrode 13. It will be appreciated that when luminescent layer 14 is excited to emit electroluminescence, tinted filters 50 and 51 color the light emitted from electroluminescent lamp 10 rendering a multicolored lighted image.

Although the present invention and its advantages have been described in detail, it should be understood that various changes, substitutions and alterations can be made herein without departing from the spirit and scope of the invention as defined by the appended claims.

I claim:

1. An electroluminescent system comprising:

a plurality of layers, said plurality of layers disposed to combine to electroluminesce, at least two of said plurality of layers stratified within a substantially monolithic mass; and the substantially monolithic mass developed using a unitary vinyl resin vehicle in gel form.

2. An electroluminescent system, comprising:

a substantially monolithic mass, the substantially monolithic mass developed using a unitary vinyl resin vehicle in gel form;

a plurality of strata, the substantially monolithic mass incarcerating at least one pair of neighboring strata in said plurality thereof;

the plurality of strata including a first electrode stratum and a dielectric stratum and an electroluminescent stratum and a second electrode stratum; and at least one of the first or second electrode strata being translucent.

3. The electroluminescent system of claim 2, in which the substantially monolithic mass is formed by the hardening of successively deposited layers.

4. The electroluminescent system of claim 3, in which at least one of said layers is also a suspension, the hardening of said suspension forming a stratum incarcerated in the substantially monolithic mass.

5. The electroluminescent system of claim 2, in which one of the first and second electrode strata is non-translucent, said non-translucent electrode stratum containing a material selected from the group consisting of graphite, gold, silver, zinc, aluminum and copper.

6. The electroluminescent system of claim 5, in which said nontranslucent electrode stratum is approximately 8 to 12 microns thick.

7. The electroluminescent system of claim 2, in which the dielectric stratum contains a material selected from the group consisting of barium-titanate, Y5V, titanium-dioxide, a mylar derivative, a teflon derivative and a polystyrene derivative.

8. The electroluminescent system of claim 2, in which the dielectric stratum is approximately 15 to 35 microns thick.

9. The electroluminescent system of claim 2, in which the electroluminescent stratum also contains an electroluminescent material and an admixture, the admixture disposed to enhance the luminescence of the electroluminescent material when said electroluminescent material is energized.

10. The electroluminescent system of claim 2, in which the electroluminescent stratum also contains an electroluminescent material and an admixture, the admixture disposed to diffuse the luminescence of the electroluminescent material when said electroluminescent material is energized.

11. The electroluminescent system of claim 2, in which the electroluminescent stratum also contains an admixture, the admixture containing barium-titanate.

12. The electroluminescent system of claim 2, in which the electroluminescent stratum is approximately 25 to 35 microns thick.

13. The electroluminescent system of claim 2, in which at least one of the first and second electrode strata contain a material selected from the group consisting of indium-tin-oxide, aluminum-oxide and tantalum-oxide.

14. The electroluminescent system of claim 2, in which at least one of the first and second electrode strata is approximately 5 microns thick.

15. The electroluminescent system of claim 2, in which said system is attached to a substrate surface.

16. The electroluminescent system of claim 15, in which the substrate surface is a material selected from the group consisting of cloth, glass, plastic, metal, wood and stone.

17. The electroluminescent system of claim 15, in which the system and the substrate surface are electrically separated.

18. The electroluminescent system of claim 2, in which the system is sealed with a cover.

19. The electroluminescent system of claim 18, in which the cover isolates the system electrically.

20. The electroluminescent system of claim 18, in which the cover contains a UV filter.

21. The electroluminescent system of claim 18, in which the cover filters light emitted by the system when energized.

22. An electroluminescent system, comprising:

a vinyl resin carrier compound in gel form;

a first electrode layer, the first electrode layer being approximately 8 to 12 microns thick, the first electrode layer including a first electrically conductive material suspended in the carrier compound, the electrically conductive material containing a conductor selected from the group consisting of graphite, gold, silver, zinc, aluminum and copper;

a dielectric layer, the dielectric layer being approximately 15 to 35 microns thick, the dielectric layer superposed on the first electrode layer, the dielectric layer including a dielectric material suspended in the carrier compound, the dielectric material containing a dielectric selected from the group consisting of barium-titanate, Y5V, titanium-dioxide, a mylar derivative, a teflon derivative and a polystyrene derivative;

a luminescent layer, the luminescent layer being approximately 25 to 35 microns thick, the luminescent layer superposed on the dielectric layer, the luminescent layer containing an electroluminescent material suspended in the carrier compound, said suspension also containing an admixture, the admixture disposed to enhance the luminescence of the electroluminescent material when said electroluminescent material is energized, the admixture further disposed to diffuse said luminescence, the admixture further disposed to optimize the consistency of said suspension, the admixture containing bariumtitanate; and a second electrode layer, the second electrode layer being translucent and approximately 5 microns thick, the second electrode layer superposed on the luminescent layer, the second electrode layer including a second electrically conductive material suspended in the carrier compound, the second electrically conductive material including a compound selected from the group consisting of indium-tin-oxide, aluminum-oxide and tantalum-oxide.

* * * * *